April 17, 1934.  E. B. KNOWLES ET AL  1,955,640
NUT SHAVING DEVICE
Filed Dec. 5, 1932   2 Sheets-Sheet 1
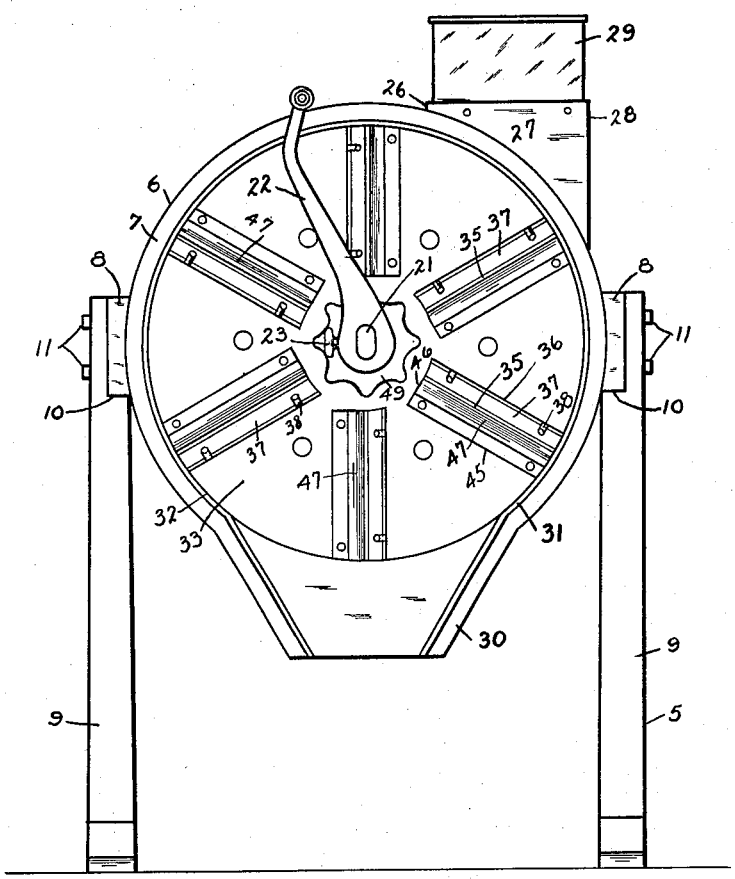
FIG. 1
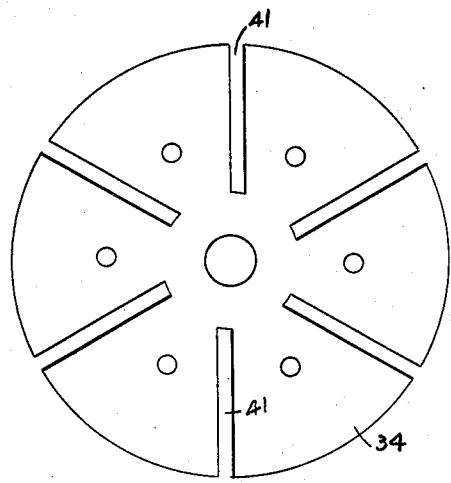
FIG. 5
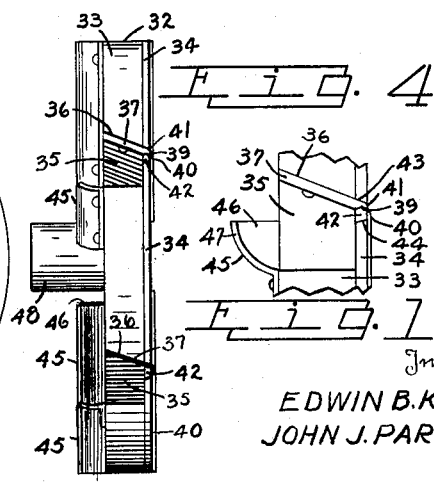
FIG. 4
FIG. 10
Inventor
EDWIN B. KNOWLES
JOHN J. PARNELL
By J.B.Dickman, Jr.
Attorney

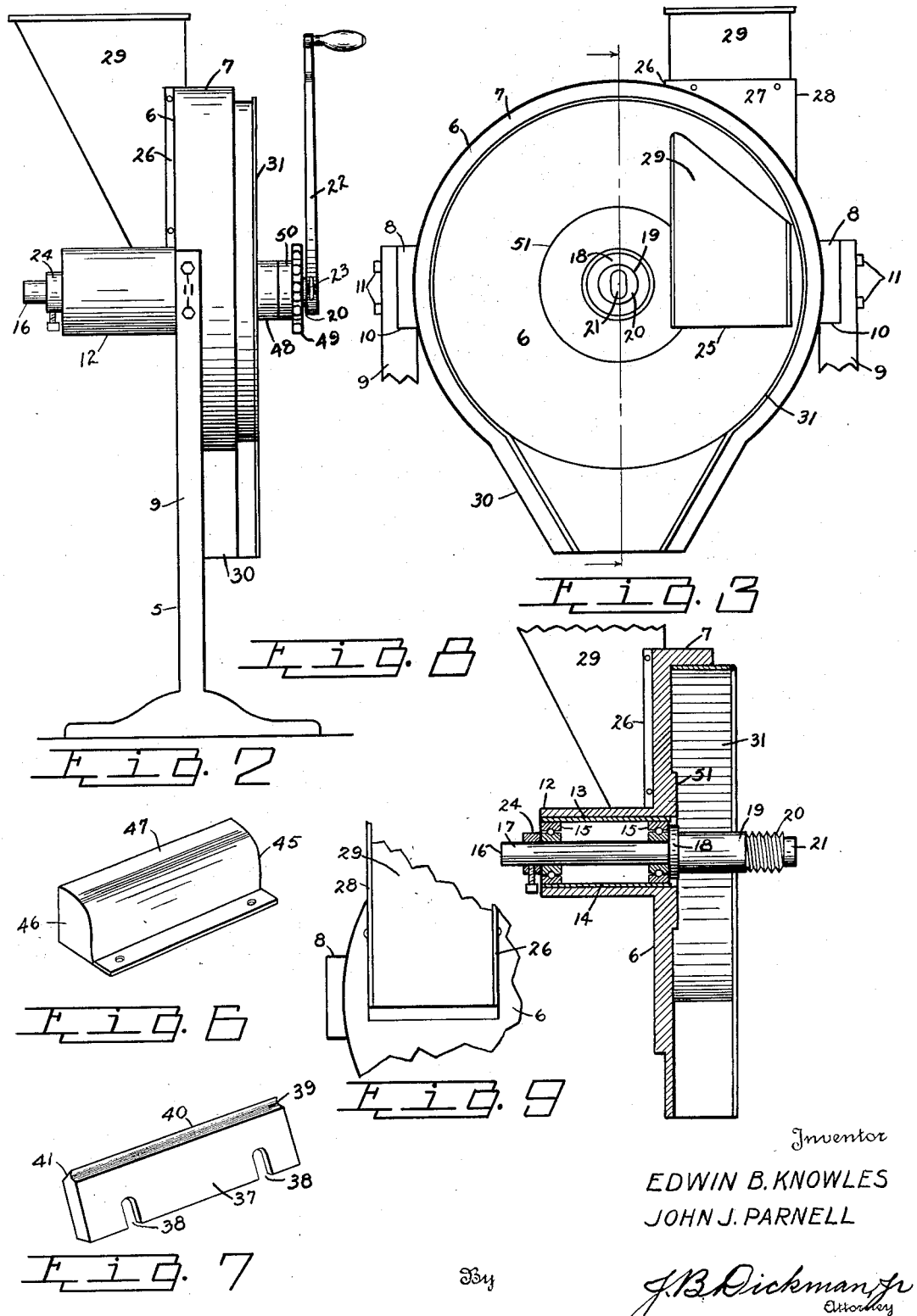

UNITED STATES PATENT OFFICE 1,955,640

NUT SHAVING DEVICE

Edwin B. Knowles and John J. Parnell, Albany, Ga.

Application December 5, 1932, Serial No. 645,796

6 Claims. (Cl. 146—114)

Our invention relates to improvements in a machine for slicing the meat of nuts into thin wafers.

An object of our invention is the provision of a device the mechanism of which is so arranged that the meat of nuts is sliced into thin wafers, thereby rendering the meat of the nut easy to masticate, and also more suitable for use in pastries, candies and the like, instead of the present day method of crushed nuts.

A further object of our invention is the provision of a rotatable disc assembly, one plate of which is provided with a plurality of elongated radially disposed openings, the walls of the openings being disposed at opposite angles.

A still further object of our invention is the provision of a rotatable disc assembly having a disc provided with a plurality of enlarged radially disposed openings, one wall of each of said openings being disposed at an angle, the angular wall being uniplaner with one wall of each of the elongated openings.

A still further object of our invention is the provision of a planer type knife angularly disposed and having a semi-circular groove, the cutting edge extending beyond the outer face of the disc assembly.

A still further object of our invention is the provision of a plurality of radially disposed baffle pockets on the outer face of the disc assembly, the pockets partially covering the openings, one end of the pockets being closed.

A still further object of our invention is the provision of a nut shaving device that may be manually, mechanically or electrically operated.

A still further object of our invention is the provision of a casing having an annulus, hopper engaging means in the casing, means on the inner face of the casing for spacing the rotatable knives therefrom and supporting means for the casing on the annulus.

A still further object of our invention is the provision of a nut shaving device, simple in construction, having a minimum number of parts, and one that may be manufactured at a minimum cost.

An important object of our invention is the provision of a means on the inner face of the casing, preventing the knife edges from engaging said face during rotation.

With these and other objects in view, our invention consists in the novel construction, arrangement and formation of parts as will be hereinafter more specifically described, claimed and illustrated in the accompanying drawings, in which:

Figure 1 is a front elevational view of our device fully assembled.

Figure 2 is a side elevational view of same.

Figure 3 is a front elevational view, the rotating disc assembly removed, showing the inner face of the casing, the opening in the casing, the annular shoulder for spacing the knives on the disc from the inner face of the casing, the standards being shown fragmentarily.

Figure 4 is a side elevational view of the disc assembly illustrating the arrangement of the openings in the discs, one wall of the enlarged openings being disposed at an angle, each wall of the elongated openings being disposed at opposite angles to each other, one of the walls being uniplaner with the angularly disposed wall of the enlarged opening, the baffle pockets being shown on one face, and the knife edges projecting through the elongated openings and beyond the face of the disc assembly.

Figure 5 is a rear elevational view of the disc assembly illustrating the elongated openings without the knives.

Figure 6 is a perspective view of one of the baffle pockets, showing the curved body and closed end.

Figure 7 is a detail perspective view of the planer type knife, showing the fluted blade, and means in the body of the blade for ready removal from the disc wall.

Figure 8 is a sectional view taken on line 8—8 of Figure 3, showing the shaft mounting and lubricating chamber.

Figure 9 is a fragmentary view showing the means on the outer face of the casing for rigidly securing the hopper, to the casing.

Figure 10 is an enlarged detail fragmentary view, showing the enlarged opening in the disc assembly, the knife positioned on the angularly disposed wall of the opening, the elongated opening, the walls of which being disposed at an angle to each other, the knife extending through the opening, and the position of the baffle pocket on the disc in relation to the enlarged opening.

Referring to the drawings in detail, wherein similar reference characters designate corresponding parts throughout the several views, the numeral 5 represents the nut shaving device, having a casing 6 of any suitable material, an annulus 7 integral with the casing and ears 8 on the outer peripheral wall of the annulus and integral therewith.

The casing 6 is mounted between the standards 9, the upper portion of the standards having a cut out portion forming a shoulder 10. The ears 8 engage the cut out portion and rest on the shoulder providing a support for the casing, the standards being rigidly secured to the ears by bolts 11.

Concentric on the outer face of the casing and integral therewith is a hub 12 projecting outwardly an appreciable distance, the hub being provided with a bore 13 and an enlarged lubricating chamber.

Mounted within the bore 13 is a sleeve 14, each end of which has mounted therein a thrust bearing 15, through which passes a rotatable shaft 16, having a reduced shank 17, an annular flange 18, an enlarged shank 19 a portion of said shank being provided with threads 20, the end of the shank portion 19 having a reduced oblong end 21 for the reception of a handle 22 which is securely held in position by a wing bolt 23. The reduced shank 17 adjacent its end has a lock ring collar 24 which is secured to the shaft by a bolt.

The casing 6 is further provided with a hopper opening 25, having three vertical sides, 26, 27 and 28, the sides being integral with the casing. A hopper 29 engages the opening and is rigidly secured to the sides 26, 27 and 28 by rivets or bolts. The hopper is provided with an opening that registers with the opening in the casing. One wall of the hopper is provided with an angularly disposed wall which allows the food in the hopper to feed automatically to the blades. The lower portion of the casing 6 terminates into a a chute 30.

Mounted and impinging against the inner peripheral wall of the annulus 7 is a guard band 31, the lower portion of the band terminating into a discharge chute, and following the inner wall of the annulus chute. It is to be noted that the guard band extends out from the edge of the annulus and serves a two fold purpose. First it protects the operator from the rotatable disc assembly, and second it acts as an abutment, preventing the shaved product in the baffle pockets from being discharged before reaching the chute.

Mounted on the enlarged shank 19 of the rotatable shaft 16 and housed in the casing and guard band is a disc assembly 32 which comprises discs 33 and 34 of unequal thicknesses. The disc 33 is provided with a plurality of enlarged radially disposed openings 35, one wall 36 of each of said openings being disposed at an angle. On the angularly disposed wall of each of said openings is a knife 37 having slots 38 which engage any suitable fastening means of the wall 36. The knife is provided with a semi-circular groove 39 having a cutting edge 40 on one longitudinal edge, a portion of said edge being disposed at an angle 41 as illustrated in Figure 7. By providing the knives with slots, we provide a ready means for removal of the blades from the disc when they become dull.

The disc plate 34 is secured to the disc 33 in any suitable manner, and this disc is provided with a plurality of elongated radially disposed openings 42, the walls 43 and 44 of the openings being disposed at opposite angles, the wall 43 being uniplaner with the wall 36. The cutting edge 40 of the knives protrude through the openings 42 and extend out from the face of the plate a slight distance. On the outer face of the disc 33 and secured thereto in any suitable manner are a plurality of radially disposed baffle pockets 45, one end 46 of each of said pockets being closed. The pockets have an arcuated body portion 47 and are positioned on the disc 33 in such a manner that they partially cover the openings 35 for a purpose to be later described.

On the outer face of the disc 33 and concentric therewith is a hub 48 having a bore therein, the hub extending from the face of the disc an appreciable distance. A lock nut 49 having a hub 50 which is internally threaded engages the threaded portion 20 of the rotatable shaft 16, and locks the disc assembly 32 securely on the shaft. In locked position the inner face of the disc 34 impinges against the annular flange 18, on the shaft 16. The flange 18 is of a thickness allowing a fraction of an inch out from the annular flange on the inner face of the casing.

The disc assembly 32 is further offset from the inner face of the casing 6 by the annular flange 51, which prevents the knife edges contacting the inner face of the casing and thus preventing them from becoming damaged.

In the operation of our device, the meat of nuts is placed in the hopper 29, the nuts automatically feeding themselves by gravity because of the sloping wall of the hopper to the knife blades. If desired a weight may be placed on top of the nuts in the hopper to give additional weight in forcing them to the knives.

The disc assembly 32 is rotated by motion imparted from the handle 22 in a clockwise manner. As the knives in the disc assembly contact the opening in which the nuts are contained, the knives engage the nuts and shave them into thin wafers. The shaved product falls into the baffle pockets where it is retained until the pocket reaches a substantially vertical position, then the product is discharged into the discharge chute and into a container provided under the chute.

Having fully described our invention, which is susceptible to different modifications, and changes in detail may be made without departing from the spirit or scope of our invention, but what we claim as new is:—

1. In a nut shaving device, comprising a casing, a disc assembly rotatably mounted in said casing, said disc assembly comprising discs of unequal thickness, one of said discs having a plurality of enlarged radially disposed openings, one wall of said openings being disposed at an angle, a knife mounted on each of said angularly disposed walls and baffle pockets radially disposed on the outer face of said disc.

2. In a nut shaving device, comprising a casing, a disc assembly rotatably mounted in said casing, said disc assembly comprising discs of unequal thickness, one of said discs having a plurality of enlarged radially disposed openings, one wall of said openings being disposed at an angle, a knife mounted on each of said angularly disposed walls, a plurality of baffle pockets radially disposed on the outer face of said disc, said pockets having one end closed.

3. In a nut shaving device, comprising a casing, a disc assembly rotatably mounted in said casing, said disc assembly comprising discs of unequal thickness, one of said discs having a plurality of enlarged radially disposed openings, one wall of each of said openings being disposed at an angle, the other of said discs having a plurality of reduced radially disposed openings communicating with the enlarged openings, the walls of said reduced openings being disposed at opposite angles, one wall of said reduced openings being uniplanar with the angularly disposed wall of the enlarged radially disposed openings, a knife mounted on each angularly disposed wall of said enlarged openings and extending through the reduced openings, the cutting edge of said knives extending beyond the face of the disc having the reduced openings.

4. In a nut shaving device, comprising a casing of substantially circular configuration, having an annulus at the periphery thereof, the outer face of the casing having a hub, a bore in said casing and hub, an opening in said casing having flanges around the opening and on the outer face of the casing, a sleeve mounted in said bore, thrust bearings mounted in the sleeve, a rotatable shaft mounted in said bearings, said shaft having an annular flange abutting the outer end of the bearing, an annular shoulder on the inner face of said casing, a disc carrying knives carried on said shaft abutting said annular flange, the lower walls of said annulus being disposed at an angle to each other.

5. In a nut shaving device, comprising a casing of substantially circular configuration, having an annulus at the periphery thereof, the outer face of the casing having a hub, a bore in said hub and casing, an opening in said casing having flanges around the opening and on the outer face of the casing, a feed hopper engageable with said flanges having an opening communicating with the opening in said casing, an annular shoulder on the inner face of said casing, a disc carrying radial knives, said disc being offset from said shoulder, the inner peripheral wall of said annulus having a guard band secured thereto, the lower walls of said annulus and guard band being disposed at an angle to each other.

6. In a nut shaving device, comprising a casing of substantially circular configuration, having an annulus at the periphery thereof, the outer face of the casing having a hub, a bore in said casing and hub, an opening in said casing having flanges around the opening and on the outer face of the casing, a feed hopper having an opening, said feed hopper secured to the flanges around the opening, said hopper opening communicating with said casing opening, an annular shoulder on the inner face of said casing, ears diametrically disposed on the outer wall of said annulus, a sleeve mounted in said bore, thrust bearings mounted in the sleeve, a rotatable shaft mounted in said bearings, said shaft having an annular flange abutting the outer end of one of said bearings, an annular shoulder on the inner face of said casing, a disc carrying knives, said disc being offset from said shoulder, the inner peripheral wall of said annulus having a guard band secured thereto, the lower walls of said annulus and guard band being disposed at an angle to each other.

EDWIN B. KNOWLES.
JOHN J. PARNELL.